US011942250B2

(12) United States Patent
Wada

(10) Patent No.: US 11,942,250 B2
(45) Date of Patent: Mar. 26, 2024

(54) WINDING CORE WITH ELECTRODES AND COIL COMPONENT

(71) Applicant: Murata Manufacturing Co., Ltd., Kyoto-fu (JP)

(72) Inventor: Tomoyuki Wada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 507 days.

(21) Appl. No.: 17/197,981

(22) Filed: Mar. 10, 2021

(65) Prior Publication Data

US 2021/0287837 A1 Sep. 16, 2021

(30) Foreign Application Priority Data

Mar. 12, 2020 (JP) ................................ 2020-043235

(51) Int. Cl.

| | |
|---|---|
| ***H01F 27/29*** | (2006.01) |
| ***H01F 17/04*** | (2006.01) |
| ***H01F 27/28*** | (2006.01) |
| ***H01F 41/04*** | (2006.01) |

(52) U.S. Cl.

CPC ....... *H01F 17/045* (2013.01); *H01F 27/2823* (2013.01); *H01F 27/292* (2013.01); *H01F 41/043* (2013.01)

(58) Field of Classification Search

CPC .. H01F 17/045; H01F 27/2823; H01F 27/292; H01F 3/10; H01F 27/2828; H01F 27/28; H01F 27/29

See application file for complete search history.

(56) References Cited

U.S. PATENT DOCUMENTS

| | | | | |
|---|---|---|---|---|
| 2017/0011843 | A1* | 1/2017 | Mikogami | H01F 27/292 |
| 2017/0200548 | A1* | 7/2017 | Takagi | H01F 27/2828 |
| 2017/0365399 | A1* | 12/2017 | Kobayashi | H01F 27/292 |
| 2018/0070451 | A1* | 3/2018 | Takagi | H05K 3/3442 |
| 2018/0158591 | A1* | 6/2018 | Kobayashi | H01F 5/04 |
| 2019/0080834 | A1* | 3/2019 | Someya | H01F 27/292 |
| 2019/0130597 | A1* | 5/2019 | Suzuki | G01C 21/26 |
| 2020/0098511 | A1* | 3/2020 | Mikogami | H01F 27/292 |

(Continued)

FOREIGN PATENT DOCUMENTS

| | | |
|---|---|---|
| JP | H09-165669 A | 6/1997 |
| JP | 2007-281554 A | 10/2007 |

(Continued)

*Primary Examiner* — Mang Tin Bik Lian

(74) *Attorney, Agent, or Firm* — Studebaker & Brackett PC

(57) ABSTRACT

A winding core includes a plurality of terminal electrodes on each flange portion, with a plurality of end surface electrode portions arranged at an interval on an outer end surface of the flange portion. To secure a predetermined interval between each of the plurality of end surface electrode portions, it is desirable for the dimension of each end surface electrode portion in a width direction to be as narrow as possible. Thus, a mask for forming an end surface base electrode layer, which is a base of an end surface electrode portion in a patterned state by sputtering, is improved to narrow a penetration passage through which particles of a film forming material pass. Thus, the dimension of the end surface base electrode layers, which are arranged at an interval in the width direction, in the width direction is less than 0.1 mm at the maximum value.

20 Claims, 5 Drawing Sheets

(56) References Cited

U.S. PATENT DOCUMENTS

| | | | | |
|---|---|---|---|---|
| 2020/0111602 | A1* | 4/2020 | Mikogami .......... | H01F 27/2828 |
| 2020/0335249 | A1* | 10/2020 | Sukegawa ........... | H01F 27/2828 |

FOREIGN PATENT DOCUMENTS

| | | | |
|---|---|---|---|
| JP | 2017-228766 | A | 12/2017 |
| JP | 2019-106516 | A | 6/2019 |
| JP | 2019-135763 | A | 8/2019 |

* cited by examiner

WINDING CORE WITH ELECTRODES AND COIL COMPONENT

CROSS-REFERENCE TO RELATED APPLICATION

This application claims benefit of priority to Japanese Patent Application No. 2020-043235, filed Mar. 12, 2020, the entire content of which is incorporated herein by reference.

BACKGROUND

Technical Field

The present disclosure relates to a winding core with electrodes for holding a wound wire in a winding type coil component, and a coil component including the winding core with electrodes, and particularly relates to a form of a terminal electrode included in the winding core with electrodes.

Background Art

Technology of interest for the disclosure is described in, for example, Japanese Patent Application Laid-Open No. 2017-228766. The technology described in Japanese Patent Application Laid-Open No. 2017-228766 relates to a winding type coil component, and the coil component has a drum-shaped core and a wire wound around a winding core portion of the core.

The core has the winding core portion, and a first flange portion and a second flange portion respectively provided at a first end portion and a second end portion of the winding core portion, which are opposite to each other.

Each of the first flange portion and the second flange portion has a bottom surface that faces a mounting board side at the time of mounting; a top surface on a side opposite to the bottom surface; an inner end surface that connects the bottom surface and the top surface and faces a winding core portion side; an outer end surface on a side opposite to the inner end surface; and a first side surface and a second side surface that connect the bottom surface and the top surface, connect the inner end surface and the outer end surface, and face each other.

When a direction in which the first side surface and the second side surface face each other is a width direction, two first terminal electrodes are provided on the first flange portion to be arranged at an interval side by side in the width direction, and two second terminal electrodes are provided on the second flange portion to be arranged at an interval side by side in the width direction.

Each of the above-described first terminal electrode and second terminal electrode has a bottom surface electrode portion that covers the bottom surface of each of the first flange portion and the second flange portion, and an end surface electrode portion that extends from the bottom surface electrode portion to a part of the outer end surface. These terminal electrodes have a structure in which a metal electrode is used as a base and a conductive resin electrode is formed on the metal electrode. The metal electrode contains metals such as Ag, Cu, and Ni, and is formed by baking a conductive paste containing these metals. Paragraph of Japanese Patent Application Laid-Open No. 2017-228766 describes that the metal electrode may be formed by adhering a sheet-shaped metal member, or may be formed by other film forming means, for example, sputtering or the like.

SUMMARY

For in-vehicle winding type coil components and the like, it is required that a mounting solder can form fillets in order to obtain high reliability and confirm the adhesion of the mounting solder. Therefore, as described above, the terminal electrode has to include the end surface electrode portion which is a portion contributing to the formation of the fillets at the time of mounting, in addition to the bottom surface electrode portion.

On the other hand, in coil components as multi-terminal products such as common mode choke coils and transformers, in a case where the terminal electrode includes the end surface electrode portion, a plurality of end surface electrode portions are arranged at an interval on the outer end surface of the flange portion. In this case, a predetermined interval has to be secured between each of the plurality of end surface electrode portions. Therefore, it is desirable to make the dimension of each end surface electrode portion in the width direction as narrow as possible.

From the viewpoint of mass productivity, a method is adopted in which when the plurality of end surface electrode portions are formed side by side on the outer end surface of the flange portion, a mask in which a formation position of the end surface electrode portion is an opening is prepared; the mask is arranged on the outer end surface; and sputtering or printing is performed through the mask to form an end surface electrode portion, more accurately, an end surface base electrode layer, which is a base of the end surface electrode portion, at a predetermined position on the outer end surface.

Here, the mask is usually composed of a metal plate, and the opening is formed by performing etching on the metal plate. However, it is known that the minimum width of the opening that can be formed by this etching is limited to about the plate thickness of the metal plate. Since the practical plate thickness of the mask used for forming the end surface base electrode layer of the winding type coil component is limited to about 0.1 mm at the minimum, the minimum width of the opening is also about 0.1 mm, and therefore, it is difficult to make the dimension of the end surface base electrode layer in the width direction less than 0.1 mm. In fact, there is no product in which the dimension of the end surface base electrode layer in the width direction is less than 0.1 mm.

Therefore, the disclosure provides a winding core with electrodes that includes an end surface electrode portion which is made possible by overcoming the above-described difficulty and of which the dimension in the width direction is narrow, and a coil component including the winding core with electrodes.

The disclosure is directed to a winding core with electrodes including a winding core that has a winding core portion where a wound wire has to be arranged, and a first flange portion and a second flange portion that are respectively provided at a first end portion and a second end portion of the winding core portion, the first end portion and the second end portion being opposite to each other in an axial direction; and a plurality of terminal electrodes provided on each of the first flange portion and the second flange portion.

Each of the first flange portion and the second flange portion has a bottom surface that faces a mounting board side at the time of mounting; a top surface on a side opposite to the bottom surface; an inner end surface that connects the bottom surface and the top surface and faces a winding core portion side; an outer end surface on a side opposite to the inner end surface; and a first side surface and a second side surface that connect the bottom surface and the top surface, connect the inner end surface and the outer end surface, and face each other.

Each of the terminal electrodes has a bottom surface electrode portion that covers the bottom surface of each of the first flange portion and the second flange portion, and an end surface electrode portion that extends from the bottom surface electrode portion to a part of the outer end surface.

When a direction in which the first side surface and the second side surface face each other is a width direction, the plurality of terminal electrodes are provided on each of the first flange portion and the second flange portion to be arranged at an interval side by side in the width direction.

In the disclosure, the end surface electrode portion has an end surface base electrode layer, and a dimension of the end surface base electrode layer in the width direction is less than 0.1 mm at a maximum value.

The disclosure is also directed to a coil component. The coil component according to the disclosure includes the winding core with electrodes described above; and a plurality of wires each of which is wound around the winding core portion while being connected between any of the plurality of terminal electrodes provided on the first flange portion and any of the plurality of terminal electrodes provided on the second flange portion.

According to the disclosure, since the dimension of the end surface base electrode layer in the width direction is as short as less than 0.1 mm at the maximum value, the dimension of the end surface electrode portion, which is formed using the end surface base electrode layer as a base, in the width direction can inevitably be shortened.

Therefore, it is possible to shorten the dimension of the winding core in the width direction, and it is possible to miniaturize the coil component including the winding core.

Further, when the same dimension is maintained for the winding core, since the interval between the plurality of end surface electrode portions can be widened while maintaining the same dimension, the mounting reliability can be improved. Alternatively, more end surface electrode portions can be arranged on the outer end surface of the flange portion while maintaining the same dimension for the winding core.

Further, since the dimension of the end surface electrode portion in the width direction can be shortened, the degree of freedom in the arrangement position of the end surface electrode portion is improved.

DETAILED DESCRIPTION

A coil component 1 according to one embodiment of the disclosure will be described with reference to FIG. 1. A surface of the coil component 1 illustrated in FIG. 1 which faces a mounting board side at the time of mounting faces upward.

Figure 1:
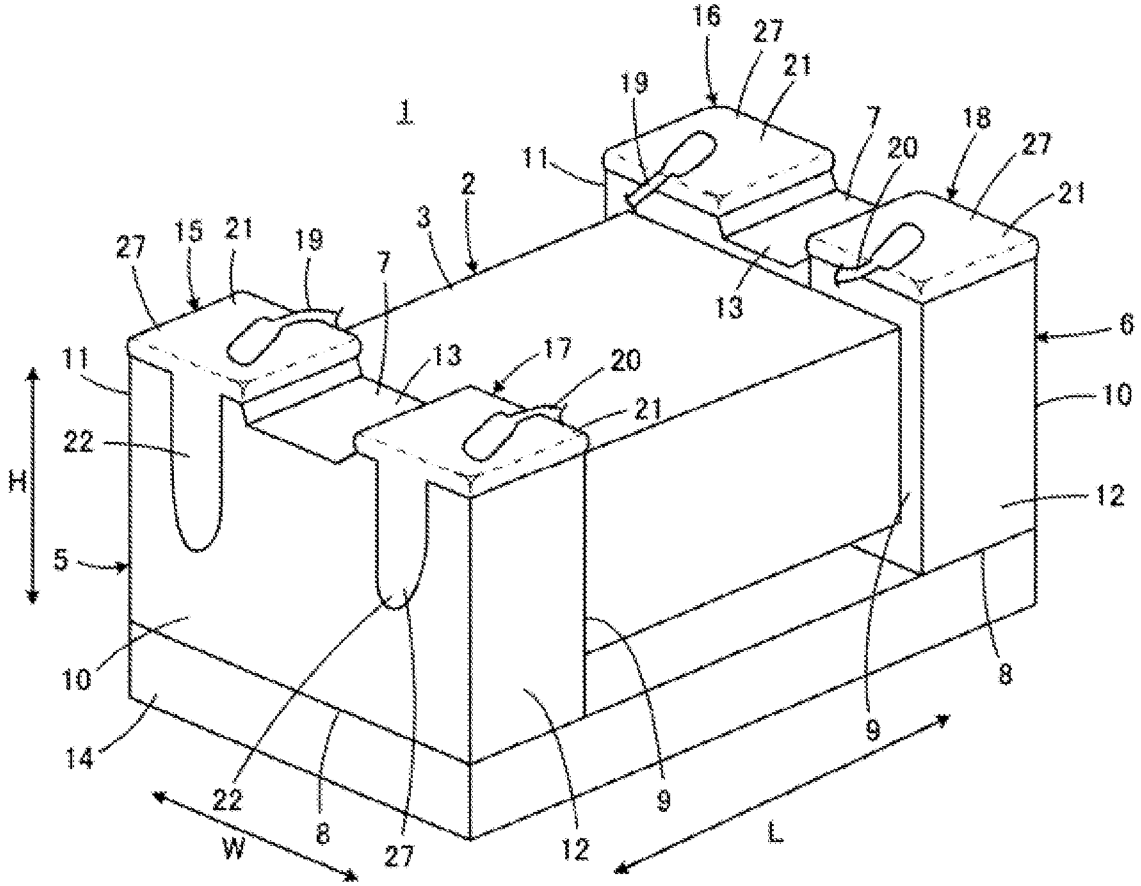
FIG. 1 is a perspective view illustrating an appearance of a coil component according to one embodiment of the disclosure, and illustrates a surface facing upward, the surface facing a mounting board side at the time of mounting.

As illustrated in FIG. 1, the coil component 1 includes a winding core 2. The winding core 2 is typically composed of ferrite, but may also be composed of a sintered body such as alumina, a molded body such as a resin containing a metal magnetic powder or an insulating filler, or the like. The winding core 2 has a winding core portion 3, and a first flange portion 5 and a second flange portion 6 respectively provided at a first end portion and a second end portion of the winding core portion 3, which are opposite to each other in an axial direction (length direction) L. The winding core 2 has a dimension of, for example, about 2.0 to 4.5 mm in the axial direction L, but there is no particular restriction on the dimension.

The first flange portion 5 and the second flange portion 6 provided in the winding core 2 have symmetrical shapes. Therefore, the first flange portion 5 will be described in detail, and the second flange portion 6 will not be described in detail.

The first flange portion 5 has a bottom surface 7 that faces a mounting board side at the time of mounting; a top surface 8 on a side opposite to the bottom surface 7; an inner end surface 9 that connects the bottom surface 7 and the top surface 8 and faces the winding core portion 3 side; an outer end surface 10 on a side opposite to the inner end surface 9; and a first side surface 11 and a second side surface 12 that connect the bottom surface 7 and the top surface 8, connect the inner end surface 9 and the outer end surface 10, and face each other. Further, a recess 13 is provided in a central portion of the bottom surface 7.

When a direction in which the first side surface 11 and the second side surface 12 face each other is a width direction W and a direction in which the bottom surface 7 and the top surface 8 face each other is a height direction H, the outer end surface 10 has, for example, a dimension in the width direction W of about 1.2 to 3.2 mm and a dimension in the height direction H of about 1.0 to 1.7 mm. However, there is no particular restriction on the dimension.

The reference numerals 7, 8, 9, 10, 11, 12, and 13 which are used to respectively refer to the bottom surface, top surface, inner end surface, outer end surface, first side surface, second side surface and recess of the first flange portion 5 described above may also be used to respectively refer to the corresponding portions of the second flange portion 6, as needed.

The coil component 1 may also include a top plate 14 that connects the top surface 8 of the first flange portion 5 and the top surface 8 of the second flange portion 6. The top plate 14 is joined to the top surface 8 of each of the first flange portion 5 and the second flange portion 6 with an adhesive interposed therebetween. When both the winding core 2 and the top plate 14 are made of a magnetic material such as ferrite or a magnetic material such as a resin containing a ferrite powder or a metal magnetic powder, the top plate 14 cooperates with the winding core 2 to form a closed magnetic path. Instead of the top plate 14, a resin or a resin containing a magnetic material powder as needed may be coated to connect the top surface 8 of the first flange portion 5 and the top surface 8 of the second flange portion 6.

As illustrated in FIG. 1, the coil component 1 includes a plurality of terminal electrodes, for example, a first terminal electrode 15 and a third terminal electrode 17 which are provided on the first flange portion 5, and a plurality of terminal electrodes, for example, a second terminal electrode 16 and a fourth terminal electrode 18 which are provided on the second flange portion 6. In the first flange portion 5, the first terminal electrode 15 and the third terminal electrode 17 are arranged in the width direction W at an interval with the recess 13 interposed therebetween. In the second flange portion 6, the second terminal electrode 16 and the fourth terminal electrode 18 are arranged in the width direction W at an interval with the recess 13 interposed therebetween.

Further, the coil component 1 includes a first wire 19 wound around the winding core portion 3 while being connected between the first terminal electrode 15 and the second terminal electrode 16, and a second wire 20 wound around the winding core portion 3 while being connected between the third terminal electrode 17 and the fourth terminal electrode 18.

In FIG. 1, only both end portions of the first wire 19 and the second wire 20 are illustrated, and the portion wound around the winding core portion 3 is not illustrated.

Next, the detailed structure of the terminal electrodes 15 to 18 will be described with reference to FIGS. 2 and 3 in addition to FIG. 1. Since the forms and sectional structures of the respective terminal electrodes 15 to 18 are substantially common, in the following, the first terminal electrode 15 illustrated relatively well in FIGS. 1 to 3 will be described in detail, and detailed description of the other terminal electrodes 16 to 18 will be omitted.

The first terminal electrode 15 has a bottom surface electrode portion 21 that covers the bottom surface 7 of the first flange portion 5, and an end surface electrode portion 22 that extends from the bottom surface electrode portion 21 to a part of the outer end surface 10 of the first flange portion 5.

Figure 3:
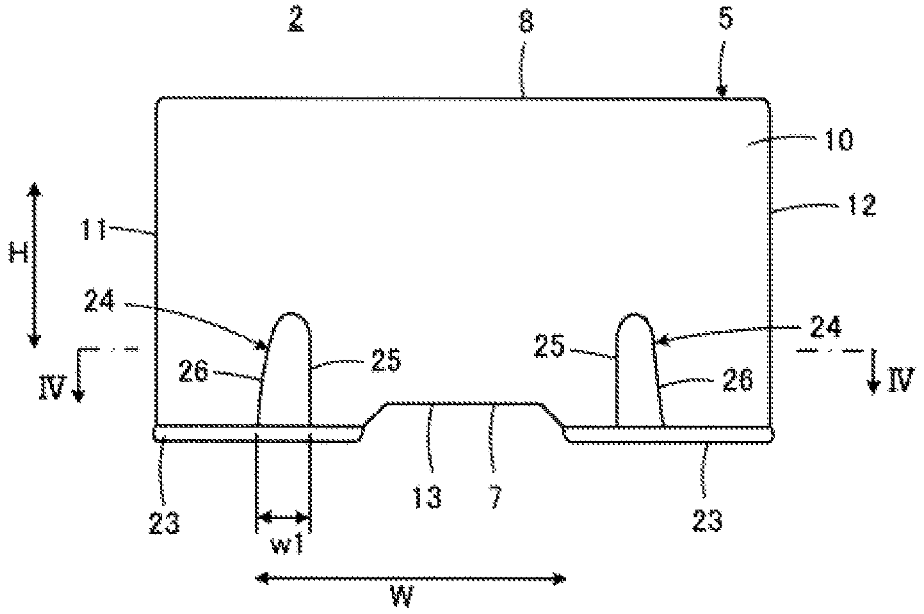
FIG. 3 is an end view illustrating the winding core with electrodes illustrated in FIG. 2, and illustrates a state before forming a plating film included in terminal electrodes.

As illustrated in FIG. 3, the bottom surface electrode portion 21 has a bottom surface base electrode layer 23 as a base. The bottom surface base electrode layer 23 is made of, for example, a sintered body containing a metal such as Ag and Si as a glass component. For example, the bottom surface base electrode layer 23 containing Ag and Si is formed by preparing a conductive paste containing Ag powder as a conductive component and Si as a glass component, applying this conductive paste to the bottom surface 7 of the first flange portion 5 by a dip method, and then baking. The thickness of the bottom surface base electrode layer 23 is about 3 to 15 μm. The bottom surface base electrode layer 23 may be not only formed on the bottom surface 7, but also formed to extend from the bottom surface 7 to a part of each of the outer end surface 10, the inner end surface 9, and the first side surface 11 that are adjacent to the bottom surface 7, and to a part of a rising surface that is parallel to the first side surface 11 and defines the recess 13.

As illustrated in FIG. 3, the end surface electrode portion 22 has an end surface base electrode layer 24 as a base. The end surface base electrode layer 24 is made of a material different from that of the bottom surface base electrode layer 23 described above. For example, the end surface base electrode layer 24 is made of a metal film that does not contain Si as a glass component. This metal film is composed of, for example, a sputtering film containing Ni and Cr. When the end surface base electrode layer 24 is composed of a metal film containing no Si in this way, since the non-conductive component is reduced in the end surface base electrode layer 24, it is possible to form the end surface base electrode layer 24 thinly while securing favorable conductivity, and it is possible to reduce the external dimensions of the coil component 1. The method of forming the end surface base electrode layer 24 will be described later with reference to FIGS. 4 to 6.

With reference to FIG. 3, the end surface base electrode layer 24 has a first side 25 and a second side 26 that define both ends thereof in the width direction W. In the winding core 2 with electrodes, the interval between the first side 25 and the second side 26 of the end surface base electrode layer 24, that is, a dimension w1 in the width direction W is less than 0.1 mm at the maximum value. As a result, since a dimension w2 (refer to FIG. 2) of the end surface electrode portion 22, which is formed using the end surface base electrode layer 24 as a base, in the width direction can inevitably be shortened, it is possible to shorten the dimension of the winding core 2 in the width direction, and it is possible to miniaturize the coil component 1 including the winding core 2. Further, when the same dimension is maintained for the winding core 2, since the interval between a plurality of end surface electrode portions 22 can be widened while maintaining the same dimension, the mounting reliability can be improved.

It is preferable that the dimension w1 of the end surface base electrode layer 24 in the width direction W exceeds 0.06 mm at the minimum value. As a result, at the time of mounting the coil component 1, solder fillet can be more reliably formed along the end surface electrode portion 22 formed using the end surface base electrode layer 24 as a base, and also the manufacturing efficiency and yield of the winding core 2 with electrodes can be improved for the reason described later.

Figure 2:
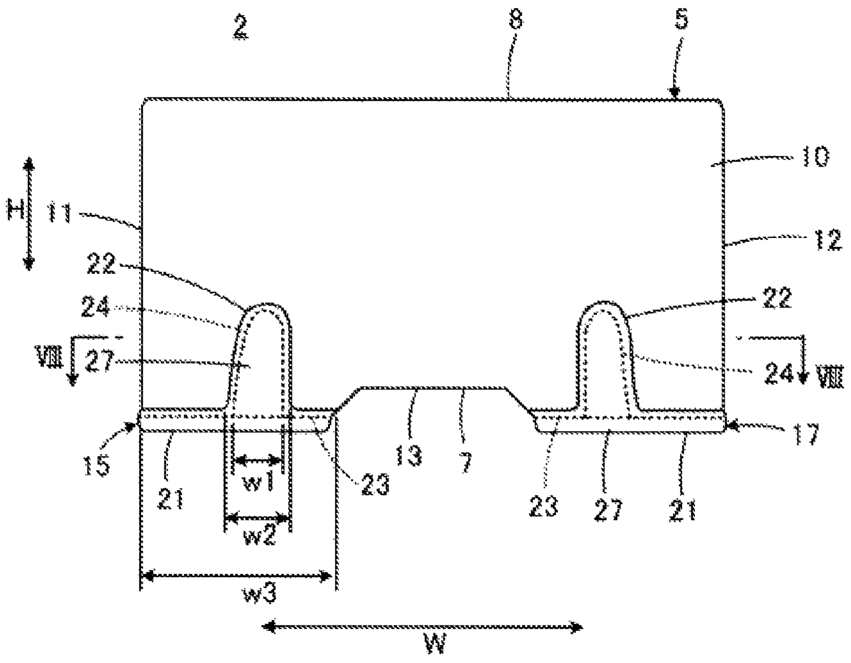
FIG. 2 is an end view illustrating a winding core with electrodes included in the coil component illustrated in FIG. 1, and is illustrated upside down from FIG. 1.

As illustrated in FIGS. 1 and 2, the first terminal electrode 15 further has a plating film 27 that covers the bottom surface base electrode layer 23 and the end surface base electrode layer 24 in a series. The plating film 27 is composed of, for example, a Cu plating layer, a Ni plating layer, and a Sn plating layer from the lower layer side. As illustrated in FIG. 2, the plating film 27 is formed with a larger area than the end surface base electrode layer 24 due to the plating growth accompanying the formation of the plating film 27, but it is preferable that the dimension w2 of the plating film 27 at the end surface electrode portion 22 in the width direction W is less than 0.1 mm at the maximum value. However, as described above, considering the plating growth, the dimension w2 of the plating film 27 at the end surface electrode portion 22 in the width direction W may be larger than the dimension w1 of the end surface base electrode layer 24 in the width direction W by about 0.05 to 0.15 mm.

Further, in this embodiment, the dimension w2 of the end surface electrode portion 22 in the width direction W is shorter than a dimension w3 of the bottom surface electrode portion 21 in the width direction W. According to this, it is possible to narrow the dimension w2 of the end surface electrode portion 22 in the width direction W without substantially reducing the fixing strength at the time of mounting the coil component 1.

The first terminal electrode 15 has been described in detail above, and the other terminal electrodes 16 to 18 also have substantially the same form and sectional structure. The reference numerals 21, 22, 23, 24, 25, 26, and 27 which are used to respectively refer to the bottom surface electrode portion, the end surface electrode portion, the bottom surface base electrode layer, the end surface base electrode layer, the first side, the second side, and the plating film of the first terminal electrode 15 may also be used to respectively refer to the corresponding portions of the other terminal electrodes 16 to 18, as needed.

Figure 4:
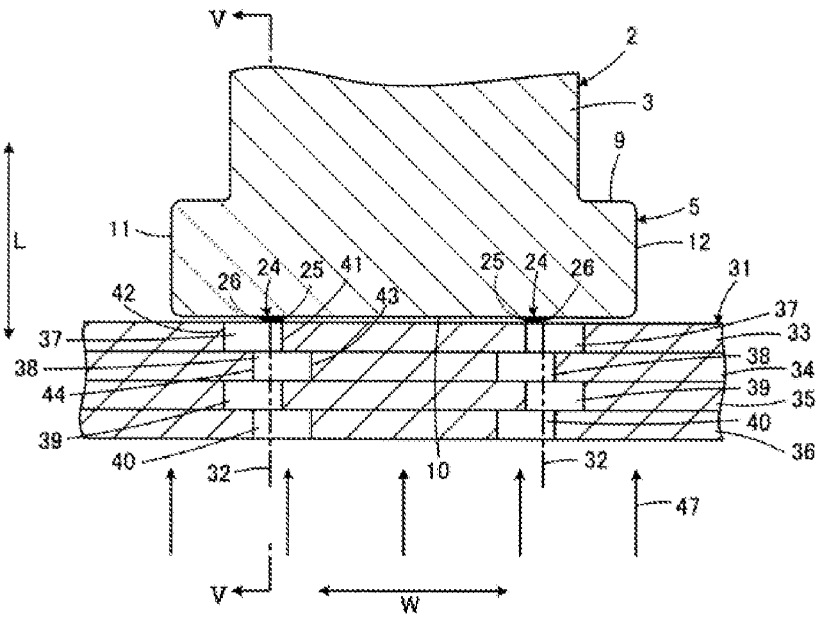
FIG. 4 is for describing a process of forming an end surface base electrode layer illustrated in FIG. 3, and is a diagram illustrating a section corresponding to a section along line IV-IV of FIG. 3.
Figure 5:
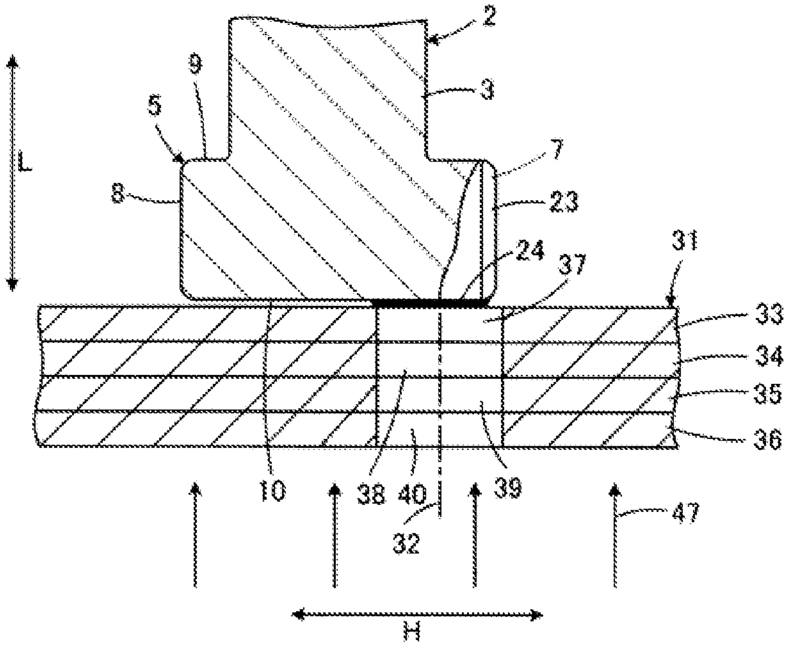
FIG. 5 is a sectional view along line V-V of FIG. 4.

Next, a preferred method of forming the terminal electrodes 15 to 18, particularly the end surface base electrode layer 24, will be described with reference to FIGS. 4 to 6. FIG. 4 illustrates the end surface base electrode layer 24 of each of the first terminal electrode 15 and the third terminal electrode 17 provided on the first flange portion 5, and FIG. 5 illustrates the bottom surface base electrode layer 23 and the end surface base electrode layer 24 of the first terminal electrode 15.

Preferably, the bottom surface base electrode layer 23 is formed before the end surface base electrode layer 24 is formed. Such a process order is adopted because the bottom surface base electrode layer 23 is made of a sintered body containing metal and glass as described above, and is accompanied by a baking process in the forming process thereof. That is, this is because undesired oxidation and deterioration may occur when the end surface base electrode layer 24 made of, for example, a sputtering film is exposed to a high temperature in the baking process for forming the bottom surface base electrode layer 23.

Next, the end surface base electrode layer 24 is formed. The metal film constituting the end surface base electrode layer 24 is, for example, a sputtering film containing Ni and Cr. The thickness of the sputtering film is, for example, about 0.1 to 1.4 μm. A mask 31 is used in the sputtering process to form the end surface base electrode layer 24 in a specific region of the outer end surface 10 with a specific pattern.

The mask 31 is arranged, for example, along the outer end surface 10 of the first flange portion 5, and forms a penetration passage 32, through which a metal material for the end surface base electrode layer 24 passes, in a thickness direction. The penetration passage 32 corresponds to a shaded region in FIG. 6.

More specifically, the mask 31 includes a plurality of stacked mask plates, for example, a first mask plate 33, a second mask plate 34, a third mask plate 35, and a fourth mask plate 36. As the plurality of mask plates that the mask 31 has to include, the first mask plate 33 and the second mask plate 34 play a particularly important role, and the number of the other mask plates 35 and 36 can arbitrarily be increased or decreased as needed.

The first mask plate 33, the second mask plate 34, the third mask plate 35, and the fourth mask plate 36 respectively have a first opening 37, a second opening 38, a third opening 39, and a fourth opening 40 each of which forms a part of the penetration passage 32.

Attention is paid to the first opening 37 of the first mask plate 33 closest to the outer end surface 10 side of the first flange portion 5 and the second opening 38 of the second mask plate 34 second closest to the outer end surface 10 side of the first flange portion 5.

First, a peripheral edge portion defining the first opening 37 of the first mask plate 33 has a first edge 41 and a second edge 42 which extend parallel to or substantially parallel to the first side 25 and the second side 26 of the end surface base electrode layer 24, respectively, and face each other.

A peripheral edge portion defining the second opening 38 of the second mask plate 34 has a third edge 43 and a fourth edge 44 which extend parallel to or substantially parallel to the first side 25 and the second side 26 of the end surface base electrode layer 24, respectively, and face each other.

Figure 6:
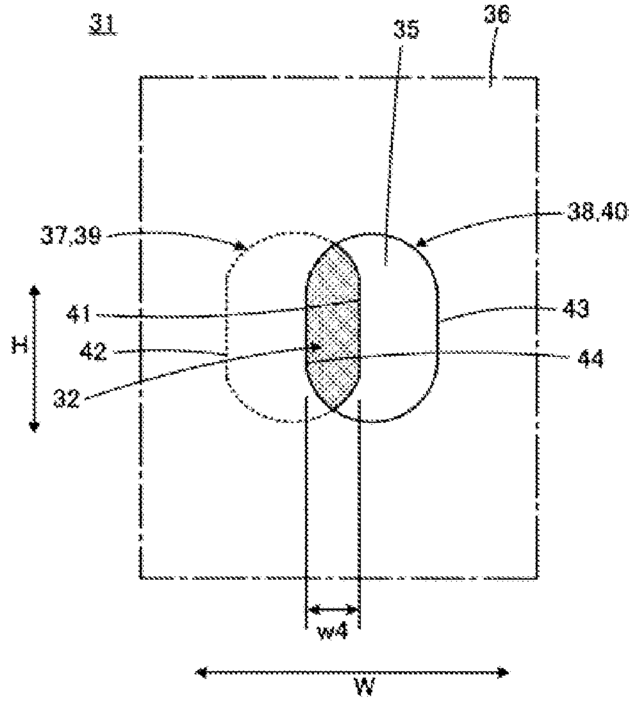
FIG. 6 is a diagram illustrating a penetration passage of a mask illustrated in FIG. 4 as viewed from below in FIG. 4.

When the first mask plate 33 and the second mask plate 34 are viewed through in a direction orthogonal to their main surface, as is well illustrated in FIG. 6, positioning is performed such that the fourth edge 44 of the second opening 38 is positioned between the first edge 41 and the second edge 42 of the first opening 37 and the first edge 41 of the first opening 37 is positioned between the third edge 43 and the fourth edge 44 of the second opening 38.

Here, an interval w4 between the first edge 41 of the first opening 37 and the fourth edge 44 of the second opening 38 can be less than 0.1 mm, for example, 0.075 to 0.08 mm by adjusting the position between the first mask plate 33 and the second mask plate 34 in the width direction W.

As illustrated in FIG. 6, the first to fourth openings 37 to 40 have an oval sectional shape, but this is only derived from the etching applied for forming the openings, and, for example, any other shape such as a rectangle can be adopted.

As described above, the practical plate thickness of each of the mask plates 33 to 36 is limited to about 0.1 mm at the minimum. Therefore, the dimension of each of the openings 37 to 40 in the width direction W, that is, the minimum width of the interval between the first edge 41 and the second edge 42 in the case of the first opening 37 is also limited to about 0.1 mm.

On the other hand, as described above, by superimposing the first mask plate 33 and the second mask plate 34, the minimum dimension of the penetration passage 32 in the width direction W is determined by the above-described interval w4, and therefore, the minimum dimension can be easily reduced to less than 0.1 mm, for example 0.075 to 0.08 mm.

The accuracy when the masks are attached to each other is generally about ±0.03 mm, and considering the case where the masks deviate in the worst direction (case where the masks are displaced in the direction in which the penetration passage 32 is blocked), the dimension of the penetration passage 32 is 0.06 mm at the maximum, which is smaller than the design value. Therefore, by making the dimension w1 of the end surface base electrode layer 24 in the width direction W exceed 0.06 mm at the minimum value as described above, it is possible to reduce the blockage of the penetration passage 32 and to improve the manufacturing efficiency (yield).

As described above, in a case where the first mask plate 33 and the second mask plate 34 are used in a superimposed state, it is inevitable that the particles passing through at least the first opening 37 spread slightly in the width direction W of the first opening 37. Therefore, in the periphery of the pattern of the end surface base electrode layer 24, so-called “blurring” is likely to occur in which the distribution density of the particles gradually is decreased as the distance from the end surface base electrode layer 24 is increased.

In particular, as for the end surface base electrode layer 24 of the first terminal electrode 15 illustrated on the left side of FIG. 4, "blurring" is likely to occur on the left side of the end surface base electrode layer 24, that is, on the second side 26 side. This is because all the particles that have passed through the second opening 38 do not go straight in the direction of arrows 47, and some of the particles spread in the width direction W of the first opening 37.

As a result, as illustrated in FIG. 3, in the end surface base electrode layer 24, the shape of the first side 25 and the shape of the second side 26 are different from each other, and more specifically, the first side 25 has a shape with higher linearity than the second side 26. This also affects the shape of the outer peripheral edge of the end surface electrode portion 22 formed using the end surface base electrode layer 24 as a base. Therefore, by changing the shape of the outer peripheral edge of the end surface electrode portion 22 by using such means, it is possible to change the adhesion mode of the solder at the time of mounting, and thereby the fixing strength of the coil component 1 to the mounting board can be adjusted.

In particular, according to the arrangement of the first opening 37 and the second opening 38 illustrated in FIG. 4, a state is obtained in which the first side 25, which has higher linearity, of the end surface base electrode layer 24 faces the first side 25, which has higher linearity, of the end surface base electrode layer 24 adjacent thereto. Therefore, in the first terminal electrode 15 and the third terminal electrode 17, the interval between the end surface electrode portions 22 can be stably secured.

The dimension of the end surface base electrode layer 24 in the height direction H is determined by the dimensions of the first opening 37 and the second opening 38 in the height direction H illustrated in FIG. 6, and is for example, 0.3 to 0.4 mm at the maximum value. However, there is no particular restriction on the dimension, and the dimension may be less than 0.1 mm at the maximum value.

Further, it is preferable that a part of the end surface base electrode layer 24 overlaps with the bottom surface base electrode layer 23. This is to improve the connection reliability between the end surface base electrode layer 24 and the bottom surface base electrode layer 23. However, since the plating film 27 covers the end surface base electrode layer 24 and the bottom surface base electrode layer 23 in a series, such overlapping is not essential. For example, even if the edge of the end surface base electrode layer 24 and the edge of the bottom surface base electrode layer 23 are in a butted state, the edge of the end surface base electrode layer 24 and the edge of the bottom surface base electrode layer 23 may be slightly separated from each other.

The first terminal electrode 15 and the third terminal electrode 17 on the first flange portion 5 side have been described above, but the same description applies to the second terminal electrode 16 and the fourth terminal electrode 18 on the second flange portion 6 side.

Figure 7:
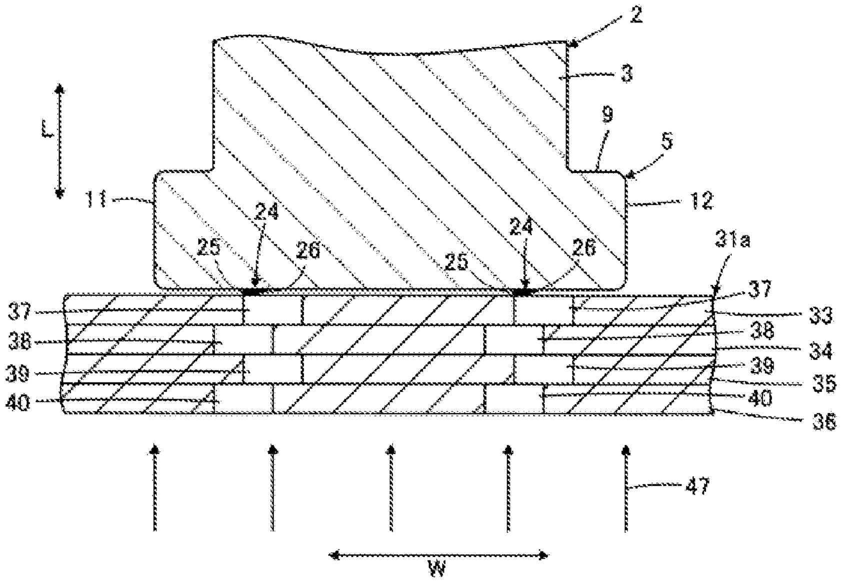
FIG. 7 is a diagram corresponding to FIG. 4, and illustrates a mask as a modification example.

FIG. 7 is a diagram which illustrates a modification example of the mask and corresponds to FIG. 4. In FIG. 7, the elements corresponding to the elements illustrated in FIG. 4 are denoted by the same reference numerals, and duplicate description will be omitted.

In a mask 31*a* illustrated in FIG. 7, an arrangement pitch of the two adjacent first openings 37 on the first mask plate 33 and an arrangement pitch of the two adjacent second openings 38 on the second mask plate 34 are the same as each other, and an arrangement pitch of the two adjacent third openings 39 on the third mask plate 35 and an arrangement pitch of the two adjacent fourth openings 40 on the fourth mask plate 36 are the same as each other. In other words, the first mask plate 33 and the second mask plate 34 have the same design, and the third mask plate 35 and the fourth mask plate 36 have the same design. Therefore, since a common mask plate can be used as the first mask plate 33 and the second mask plate 34 and a common mask plate can be used as the third mask plate 35 and the fourth mask plate 36, the cost for the mask 31*a* can be reduced.

In a case where the mask 31*a* illustrated in FIG. 7 is used, the end surface base electrode layer 24 for the third terminal electrode 17 on the right side, which has a form similar to the end surface base electrode layer 24 on the right side illustrated in FIG. 4 is obtained, but as for the end surface base electrode layer 24 for the first terminal electrode on the left side, the first side 25 having higher linearity appears on the left side.

Figure 8:
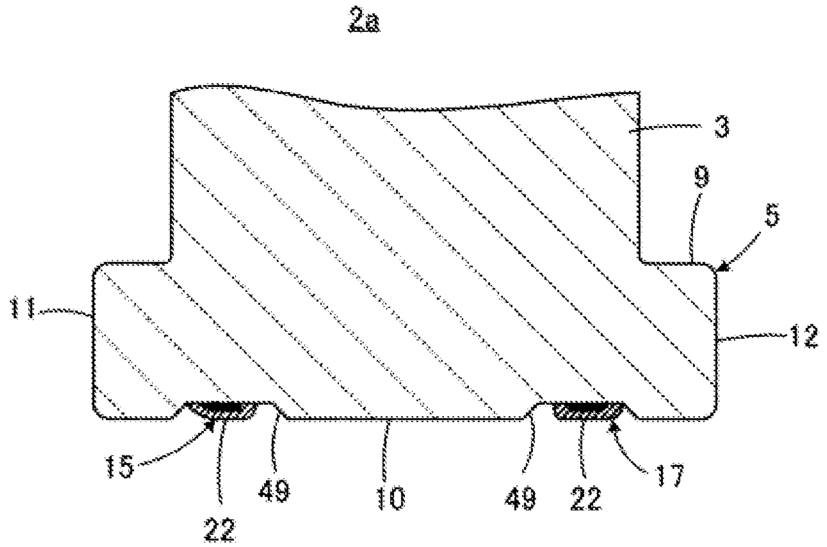
FIG. 8 is a diagram illustrating a part of a winding core with electrodes as a modification example, and illustrating a section corresponding to a section along line VIII-VIII of FIG. 2.

FIG. 8 illustrates a part of a winding core 2*a* with electrodes as a modification example. In FIG. 8, the elements corresponding to the elements illustrated in FIGS. 1 to 5 are denoted by the same reference numerals, and duplicate description will be omitted.

Describing the first flange portion 5 illustrated in FIG. 8, on the outer end surface a recess groove 49 that extends in the height direction H (refer to FIG. 1) is provided at a region where the end surface electrode portion 22 for each of the first terminal electrode 15 and the third terminal electrode 17 has to be formed. Therefore, the end surface electrode portion 22 is formed to fit in the recess groove 49. According to this configuration, there is an advantage that the protrusion of the end surface electrode portion 22 to an undesired region is easy to distinguish, and there is also an advantage that the end surface electrode portion 22 can be prevented from being rubbed by equipment such as a winding machine for manufacturing coil components and a mounter for handling.

The disclosure has been described above in relation to the illustrated embodiment, but various other embodiments are possible within the scope of the disclosure.

For example, the number of terminal electrodes provided on one of the flange portions is not limited to two as illustrated in the illustrated embodiment, and may be three or more.

Further, the coil component 1 illustrated in the drawings includes two wires 19 and and constitutes, for example, a common mode choke coil, but the coil component 1 may constitute a transformer, a balun, or the like without being limited to the common mode choke coil. Therefore, the number of wires can also be changed according to the function of the coil component, and accordingly, the number of terminal electrodes provided on each flange portion can be changed as described above.

Further, in constructing the winding core with electrodes and the coil component according to the disclosure, partial replacement or combination of configurations is possible between the different embodiments described in this specification.

What is claimed is:

1. A winding core with electrodes, comprising:

a winding core including:

- a winding core portion in which a wound wire is to be arranged, and
- a first flange portion and a second flange portion that are respectively provided at a first end portion and a second end portion of the winding core portion, the first end portion and the second end portion being opposite to each other in an axial direction, each of the first flange portion and the second flange portion including a bottom surface that faces a mounting board side at a time of mounting, a top surface opposite to the bottom surface, an inner end surface that connects the bottom surface and the top surface and faces the winding core portion side, an outer end surface opposite to the inner end surface, and a first side surface and a second side surface that connect the bottom surface and the top surface, connect the inner end surface and the outer end surface, and face each other; and a plurality of terminal electrodes provided on each of the first flange portion and the second flange portion, each of the terminal electrodes including a bottom surface electrode portion that covers the bottom surface of each of the first flange portion and the second flange portion, and an end surface electrode portion that extends from the bottom surface electrode portion to a part of the outer end surface, the end surface electrode portion including an end surface base electrode layer, when a direction in which the first side surface and the second side surface face each other is a width direction, the plurality of terminal electrodes are provided on each of the first flange portion and the second flange portion to be arranged at an interval side by side in the width direction, and a dimension of the end surface base electrode layer in the width direction is less than 0.1 mm at a maximum value.

2. The winding core with electrodes according to claim 1, wherein the dimension of the end surface base electrode layer in the width direction exceeds 0.06 mm at a minimum value.

3. The winding core with electrodes according to claim 1, wherein the end surface base electrode layer contains a metal film.

4. The winding core with electrodes according to claim 3, wherein the metal film contains a sputtering film.

5. The winding core with electrodes according to claim 1, wherein the bottom surface electrode portion includes a bottom surface base electrode layer, and the end surface base electrode layer is made of a material different from a material of the bottom surface base electrode layer.

6. The winding core with electrodes according to claim 5, wherein the bottom surface base electrode layer is made of a sintered body containing metal and glass.

7. The winding core with electrodes according to claim 5, wherein each of the terminal electrodes includes a plating film that covers the bottom surface base electrode layer and the end surface base electrode layer continuously.

8. The winding core with electrodes according to claim 7, wherein a dimension of the plating film at the end surface electrode portion in the width direction is less than 0.1 mm at the maximum value.

9. The winding core with electrodes according to claim 1, wherein a dimension of the end surface electrode portion in the width direction is shorter than a dimension of the bottom surface electrode portion in the width direction.

10. The winding core with electrodes according to claim 1, wherein the end surface base electrode layer has a first side and a second side that define opposite ends in the width direction, and a shape of the first side and a shape of the second side are different from each other.

11. The winding core with electrodes according to claim 10, wherein the first side of the end surface base electrode layer is positioned to face the first side of the adjacent end surface base electrode layer, and the first side has higher linearity than the second side.

12. A coil component comprising:

the winding core with electrodes according to claim 1; and a plurality of wires each of which is wound around the winding core portion and is connected between any of the plurality of terminal electrodes provided on the first flange portion and any of the plurality of terminal electrodes provided on the second flange portion.

13. The winding core with electrodes according to claim 2, wherein the end surface base electrode layer contains a metal film.

14. The winding core with electrodes according to claim 2, wherein the bottom surface electrode portion includes a bottom surface base electrode layer, and the end surface base electrode layer is made of a material different from a material of the bottom surface base electrode layer.

15. The winding core with electrodes according to claim 3, wherein the bottom surface electrode portion includes a bottom surface base electrode layer, and the end surface base electrode layer is made of a material different from a material of the bottom surface base electrode layer.

16. The winding core with electrodes according to claim 4, wherein the bottom surface electrode portion includes a bottom surface base electrode layer, and the end surface base electrode layer is made of a material different from a material of the bottom surface base electrode layer.

17. The winding core with electrodes according to claim 6, wherein each of the terminal electrodes includes a plating film that covers the bottom surface base electrode layer and the end surface base electrode layer continuously.

18. The winding core with electrodes according to claim 2, wherein a dimension of the end surface electrode portion in the width direction is shorter than a dimension of the bottom surface electrode portion in the width direction.

19. The winding core with electrodes according to claim 2, wherein the end surface base electrode layer has a first side and a second side that define opposite ends in the width direction, and a shape of the first side and a shape of the second side are different from each other.

20. A coil component comprising:

the winding core with electrodes according to claim 2; and a plurality of wires each of which is wound around the winding core portion and is connected between any of the plurality of terminal electrodes provided on the first flange portion and any of the plurality of terminal electrodes provided on the second flange portion.

* * * * *